SAMUEL DOUBLEDAY.

Improvement in Dumping-Carts.

No. 127,407.  Patented June 4, 1872.

Witnesses.  
A. H. Smith  
C. Hadaway

Inventor.  
Samuel Doubleday  
By his Atty  
R. D. O. Smith

UNITED STATES PATENT OFFICE.

SAMUEL DOUBLEDAY, OF BALTIMORE, MARYLAND.

IMPROVEMENT IN DUMPING-CARTS.

Specification forming part of Letters Patent No. 127,407, dated June 4, 1872; antedated May 17, 1872.

*To all whom it may concern:*

Be it known that I, SAMUEL DOUBLEDAY, of Baltimore, in the county of Baltimore and State of Maryland, have invented a new and useful Improvement in Carts; and I do hereby declare the following to be a full, clear, and exact description of the same, reference being had to the accompanying drawing, in which—

Figure 1:
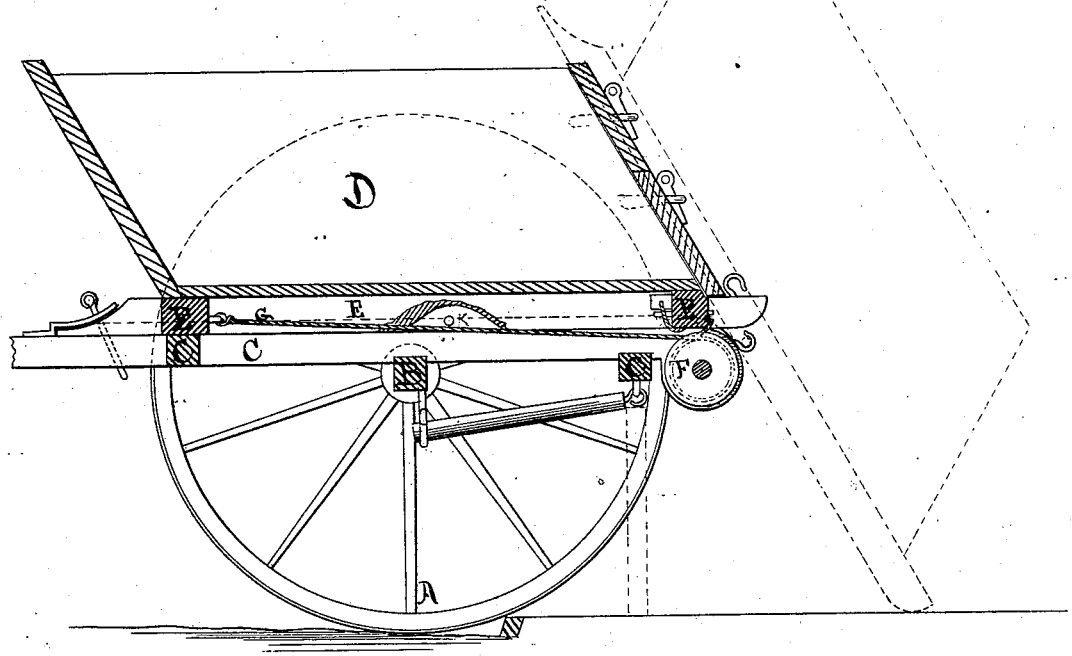
Figure 2:
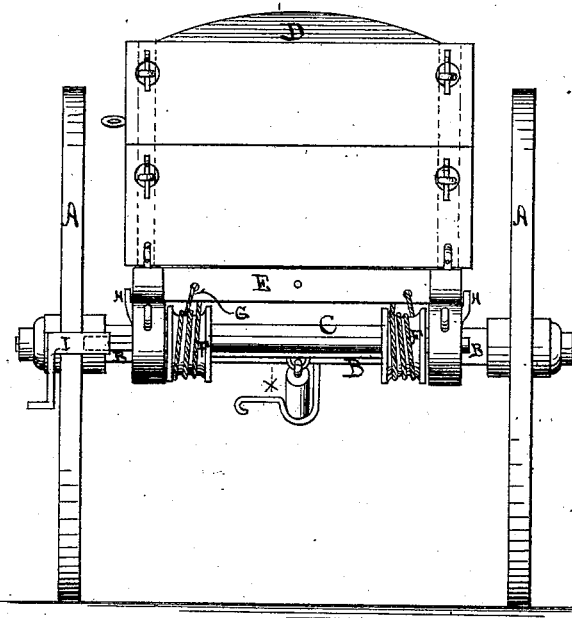

Figure 1 is a vertical longitudinal section of my improvement. Fig. 2 is a rear elevation of the same.

The carts which are used for the transportation of coal have their bodies hinged to the axle of the wheels, and when the body is inclined to discharge its load the same is thrown down mostly between the wheels. In a city the sidewalk is thus frequently obstructed in its whole width, and a portion of the load deposited in the gutter, so that passers-by are greatly incommoded. This is objectionable and a nuisance.

I propose to remedy these objections by constructing my carts to discharge their loads upon the sidewalk so far in rear of the cart-wheels as not only to prevent any of said load from falling into the gutter but also to leave a clear space along the sidewalk next the curb, for pedestrians to pass without being incommoded by the coal lying there or by the persons who may be occupied in shoveling it to the coalhole. My improvement, therefore, relates to that class of two-wheeled carts which have their bodies hinged to the frame so that the contents may be dumped; and it consists in a manner of constructing the frame and hinging the body thereto so that, while the weight of the load is centrally disposed as to the axle during the time of transportation, when being dumped the body will move upon an axis at some distance in rear of the axis of the wheels, and the load be thereby discharged at a corresponding distance in rear of the wheels.

That others may fully understand my invention, I will particularly describe it.

A A B are the wheels and axle of an ordinary cart. The frame C C is laid upon the axle B and firmly secured thereto. The side bars of said frame are extended forward to form the shafts for the attachment of the draft animal; or said shafts may be separately made and rigidly attached to said frame, as may be considered most expedient. The box or body D is mounted and firmly secured to a frame, E, which is laid upon the frame C and arranged to slide forward and backward thereon. The frame C is preferably constructed so that its rear end extends to the rear of the wheels A, and the winch F is laid across the rear end of said frame, turning in boxes rigidly secured thereto. A wire rope, G, chain, or other proper and convenient mode of attaching the sliding frame E to the winch F, may be used to move the body D, when desired. One end of the rope G is secured to the front of the frame, and the other end of said rope, after passing two or three times around the winch F, is secured to the rear end of said frame, which can be moved, therefore, in either direction by turning said winch. Guides H H are put on the sides of the frame C to keep the frame E from becoming displaced laterally. A rack and pinion may be substituted for the winch and rope, but, in my opinion, the latter is preferable. A removable key or crank, I, serves to turn the winch F. At the rear end of frame C I place hooks J J, which engage with pins K, set in frame E, when the body D is inclined to dump the load. I prefer to place the pins K across slots made in the lower side of frame E, as shown in Fig. 1. The hooks J and pins K form the axis of motion for the body D while the load is being discharged.

I make the tail-board L inclining forward, as shown, because when so inclined but little if any coal will run out upon removal of the tail-board until the body begins to tip.

In practice the body D is run back until it has nearly reached the point of equilibrium before the tail-board is removed.

Friction-rollers may be placed between frames C and E to facilitate the movement of the latter, if found to be necessary.

A swinging leg, M, is attached to the rear end of the frame C to support said frame when the load is run back for dumping. When not in use the leg M is placed in the hook N or supported in some other convenient way.

A lock-pin, O, may be employed to retain the body in position, except when the load is being dumped.

I am aware that wagons have been constructed with sliding bodies so that their loads may be dumped, but in such wagons the bodies only slide far enough to turn upon or immediately in rear of the axle, and the load is therefore discharged between the wheels the same as from a cart; whereas, with my invention, the load may be discharged as far in rear of the wheels as may be desired.

Having described my invention, what I claim as new is—

1. The frame C, extending in rear of the axle B, combined with the sliding frame E and body D, so that said body may dump its load in rear of the wheels, as and for the purpose set forth.

2. The frame C, extending in rear of the axle B, sliding frame E, winch F with the rope G, substantially as and for the purpose set forth.

3. In combination with the frame C and sliding frame E the hooks J and pins K, as set forth.

SAML. DOUBLEDAY.

Witnesses:
R. D. O. SMITH,
J. C. LYONS.